United States Patent [19]

Dilthey et al.

[11] 4,368,371
[45] Jan. 11, 1983

[54] PROCESS FOR THE SUBMERGED-ARC WELDING OF LIGHT METALS SUCH AS ALUMINUM AND ALUMINUM ALLOYS

[75] Inventors: Ulrich Dilthey, Eching; Friedrich Eichhorn, Aachen, both of Fed. Rep. of Germany; Peter Hirsch, Farmington Hills, Mich.; Peter Holbach, Aachen; Kurt Lettner, Unterschleissheim, both of Fed. Rep. of Germany

[73] Assignee: Messer Griesheim, Frankfurt am Main, Fed. Rep. of Germany

[21] Appl. No.: 184,546

[22] Filed: Sep. 8, 1980

[30] Foreign Application Priority Data

Sep. 8, 1979 [DE] Fed. Rep. of Germany ....... 2936364

[51] Int. Cl.³ .................. B23K 35/365; B23K 9/18
[52] U.S. Cl. ...................... 219/73; 148/26; 219/146.52; 219/73.2
[58] Field of Search .............. 219/73, 73.1, 73.2, 219/146.3, 146.52; 148/26

[56] References Cited

U.S. PATENT DOCUMENTS

| | | | |
|---|---|---|---|
| 2,552,105 | 5/1951 | Miller et al. | 219/146.52 X |
| 2,909,642 | 10/1959 | Landis | 219/73 |
| 3,260,834 | 7/1966 | Arnoldy | 219/73 R |
| 3,539,765 | 11/1970 | Duttera et al. | 219/146.3 X |
| 3,577,560 | 5/1971 | Lawrence et al. | 148/26 X |
| 3,636,301 | 1/1972 | Ischenko et al. | 219/73.1 X |
| 3,666,908 | 5/1972 | Crichton | 219/73.1 |
| 3,769,099 | 10/1973 | De Long et al. | 219/73 R X |
| 3,825,712 | 7/1974 | Gibbs . | |
| 4,029,933 | 6/1977 | Oishi et al. | 219/73 R X |
| 4,219,717 | 8/1980 | Kuhnen | 219/73 R X |

FOREIGN PATENT DOCUMENTS

| | | | |
|---|---|---|---|
| 2048453 | 4/1972 | Fed. Rep. of Germany | 148/26 |
| 2807525 | 8/1979 | Fed. Rep. of Germany | 219/73 |
| 52-61142 | 5/1977 | Japan | 219/73 |
| 560636 | 4/1944 | United Kingdom | 148/26 |

Primary Examiner—A. D. Pellinen
Assistant Examiner—Keith E. George
Attorney, Agent, or Firm—Connolly and Hutz

[57] ABSTRACT

A welding process for joining aluminum materials in a horizontal welding position, without preheating, this process being highly economical and characterized by minimal environmental pollution, good strength and toughness of the welded joint, in which process the arc, as in submerged arc welding of steel plates, is covered by a flux layer and burns in a closed cavity, this process being realized by the use of a flux having a flux composition of 20-70% potassium chloride (KCl), 20-70% of an alkaline earth metal chloride, preferably calcium chloride and/or magnesium chloride ($CaCl_2$ and/or $MgCl_2$), 1-20% of calcium fluoride ($CaF_2$) and preferably 1-15% of a substance capable of lowering the melting point and/or releasing gas.

3 Claims, 2 Drawing Figures

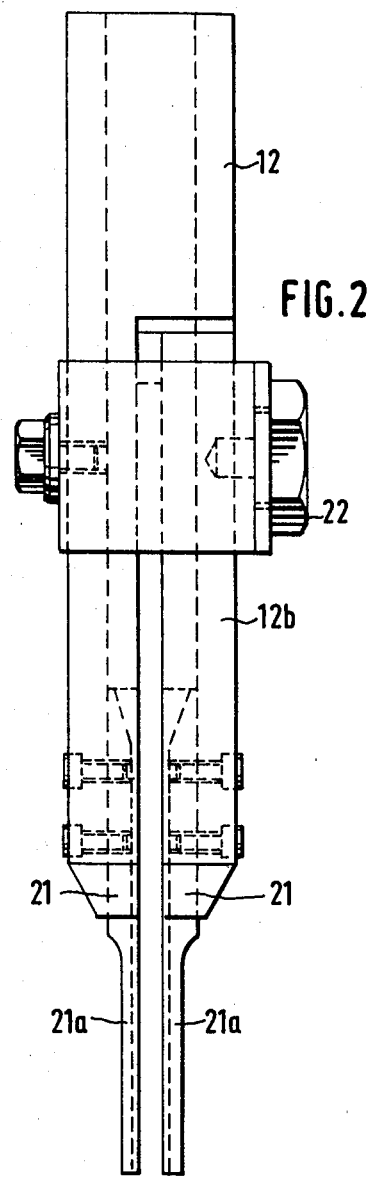

PROCESS FOR THE SUBMERGED-ARC WELDING OF LIGHT METALS SUCH AS ALUMINUM AND ALUMINUM ALLOYS

The invention relates to a welding process for light metals, such as aluminum and aluminum alloys.

At present, the gas-shielded arc welding process is employed almost exclusively for joining aluminum materials in a horizontal position. When a conventional working procedure is used, this process necessitates preheating of the plates to be joined and laying down of a large number of passes or, if the high-current or thick-wire technique is used, a complicated design of welding head capable of maintaining the gas shielding at the high current intensities. Both variants of this process give rise to a disadvantageous emission of relatively large amounts of smoke and gases (including ozone) and, additionally, they are disadvantageous by reason of their sensitivity to wind effect.

To avoid these disadvantages, efforts to exploit the advantages of submerged-arc welding, also for welding aluminum have become known, these advantages, such as high melting rate, deeper penetration, suitability for site use deriving from insensitivity to wind effect and minimal environmental pollution deriving from the absence of light, radiation, noise, smoke and gas emission, being known from the welding of steel.

Processes for submerged-arc welding of aluminum materials which have become known to date, operate with the so-called semi-exposed arc (1-3, 5), leading to unacceptable environmental pollution by smoke and gases which are to some extent poisonous.

Furthermore, flux compositions have become known with regard to these processes (1-5), which are, however, suitable only for welding pure aluminum, on account of the chemical composition of the fluxes used. In the case of joining aluminum alloys containing magnesium, these fluxes produce only inadequate strength and toughness values.

A flux of this type (3), known from the prior art, has the composition

50% KCl
15% NaCl
35% $Na_3AlF_6$

Using this flux, the required minimum values for strength and toughness can be achieved with pure aluminum, in spite of a certain porosity, although strong emission of pollutants must be accepted. In the case of the higher-strength aluminum alloys containing magnesium, these minimum values are not achieved, this being attributed to the high sodium content of the flux. For example, the tensile strength achieved with the AlMg 4.5 Mn alloy lies between 145 and 185 $N/mm^2$ (required: 275 $N/mm^2$) and the bend angle obtained on bend samples lies between 3° and 18°. The other flux compositions which have been published (1, 2-5) display only slight deviations relative to the abovementioned composition and accordingly exhibit the same deficiencies.

A further difficulty occurring in the welding of aluminum materials, is the current contact to the melting wire electrode. When conventional copper contact-nozzles are used, their bore being matched to the diameter of the wire electrode in question, the contact is made difficult by the oxide film on the wire and additionally, in the case of inert gas shielded arc welding, by the deposition of the welding fumes or, in the case of submerged-arc welding, by the penetration of constituents of the flux. Since the bore has a certain length and a somewhat larger diameter than the wire electrode, the point of contact wanders randomly along the length of the contact nozzle and thus gives rise to changes in the length of the wire stick out which can in turn lead to current fluctuations and thus to disturbances in the process.

The object of the invention is to avoid the above-mentioned disadvantages and to provide a welding process for joining aluminum materials in a horizontal welding position, without preheating, this process being highly economical and characterized by minimal environmental pollution, good strength and toughness of the welded joint, in which process the arc, as in submerged arc welding of steel plates, is covered by a flux layer and burns in a closed cavity.

According to the invention, this object is achieved by employing a flux in the submerged-arc welding of aluminum materials, this flux having a flux composition of 20-70% potassium chloride (KCl), 20-70% of an alkaline earth metal chloride, preferably calcium chloride and/or magnesium chloride ($CaCl_2$ and/or $MgCl_2$), 1-20% calcium fluoride ($CaF_2$) and preferably 1-15% of a substance capable of lowering the melting point and/or releasing gas such as, for example, a carbonate, such as potassium carbonate ($K_2CO_3$) or calcium carbonate ($CaCO_3$), or an alkali metal oxide, such as potassium oxide ($K_2O$). Furthermore, the flux can preferably contain an addition of 1 to 15% or perlite.

The desired size and strength of the grains can be achieved both by binding the flux constituents to the perlite filler and by agglomeration with a mineral binder, such as, for example, potassium silicate. A welding powder, composed of 45.2% KCl, 40.4% $CaCl_2$, 4.8% $CaF_2$, 5.7% perlite and 3.8% $K_2CO_3$, is particularly advantageous for the aluminum alloy AlMg 4.5 Mn, with regard to the quality values of the welded joint obtained. In this case, the fluoride and/or the carbonate can also be contained in the filling of a small-diameter tubular electrode or folded-wire electrode which melts off, thereby enabling the dosage to be precisely adjusted in relation to the welding parameters.

The flux according to the invention is suitable preferably for the submerged arc welding of aluminum. However, other light metals, such as magnesium and magnesium alloys, can of course be welded in an advantageous manner with the aid of this flux.

To improve the formation of the surface of the weld joint and to improve the shape of the penetration, as well as to refine the grain size of the weld deposit, the invention also makes provision for the arc to be oscillated at right angles to the welding direction during the welding process. In the case of submerged arc welding of steel, this oscillation cannot be successfully carried out, since both the ferro-magnetic properties of this material and the physical properties of the weld slag hinder the directed movement of the arc and cavity. In contrast, in the submerged arc welding of aluminum and its alloys using the flux according to the invention, a distinct improvement in the formation of the welded joint can be achieved, due to the favorable properties of the basic material and of the flux.

The process according to the invention is explained in greater detail in the following description, by reference to an arrangement for carrying out the process and with reference to the drawings, in which:

FIG. 2 shows an enlarged representation of a current contact-nozzle.

Figure 1:
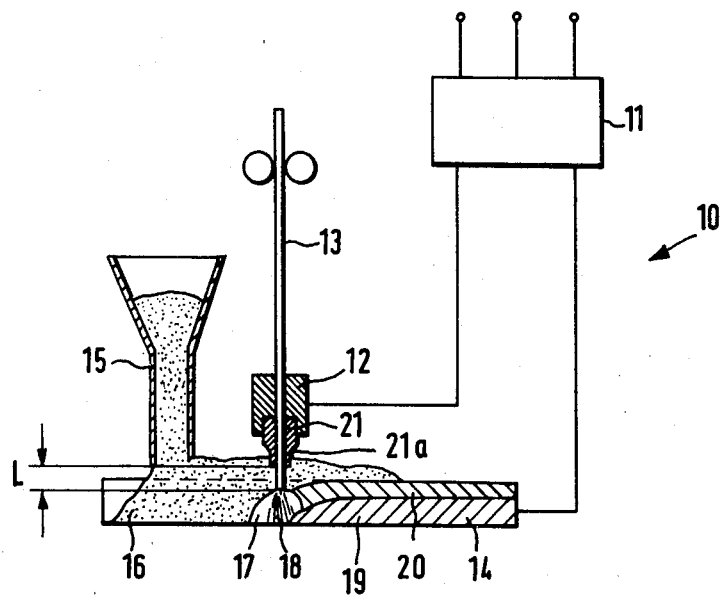
FIG. 1 shows an arrangement for submerged arc welding.

A device for submerged arc welding is shown schematically in FIG. 1 and is marked in its entirety with the number 10. The device 10 possesses a source 11 of direct current for welding, this source being connected, via a copper or brass contact nozzle 12, to an aluminum wire electrode 13 and to the workpiece 14.

The flux feeding device is marked 15, the layer of flux according to the invention is marked 16, the arc is marked 18, burning under the powder in a cavity 17, the completed weld pass is marked 19 and the slag, which is forming is marked 20. According to FIG. 2, the current contact is effected via jaws 21 which are screwed into the contact nozzle 12 and are grooved to match the diameter of the wire. The contact pressure of these jaws can be adjusted to a value, which remains constant, by means of a set-screw 22, which acts on the movable section 12b of the contact-nozzle 12.

To prevent the wire electrode from sticking or jamming between the jaws 21, the latter are made from steel, having regard to the favorable coefficient of friction between steel and the aluminum electrode.

In order to achieve a small wire stick out L (see FIG. 1), particularly without displacing the flux by the jaw 21 which dips into the powder, the contact jaws 21 are preferably designed to be extended and tapered, in the direction of the arc, in the region 21a. By means of a device according to FIGS. 1 and 2, two AlMg 4.5 Mn plates, 20 mm thick, were butt-welded in two opposed passes, without preheating, with a S-AlMg 4.5 Mn wire electrode of 3.2 mm thickness, the flux having consisted, according to the invention, of 45.2% KCl, 40.4% $CaCl_2$, 4.8% $CaF_2$, 5.7% perlite and 3.8% $K_2CO_3$. The welding direct current was 400 A, the welding voltage was 30 V and the welding speed was 45 cm/minute.

A closed cavity formed during this welding operation. No emission of relatively large quantities of smoke or gas, or of radiation, could be detected. The required strength and toughness values were achieved, thus exemplifying the particular suitability of the flux according to the invention, for the submerged arc welding of the AlMg 4.5 Mn alloy.

The invention is preferably suitable for submerged arc welding. However, it is also advantageously possible, within the scope of the invention, to fill filler-wires with the welding powder according to the invention and to employ them for welding under a protective gas. These filler wires can be used both as melting wire electrodes in inert gas shielded arc welding and also as an additional material, not connected to the electric current supply, in tungsten inert gas arc welding, re-ignition of the tungsten inert gas arc, in particular, being improved by this means. Should, in the case of tungsten inert gas arc welding, an additional melting-off contribution be undesired, by reason of the intended weld seam elevation, or for other reasons, the flux constituents can also be fed into the arc by means of a flux-feeding unit.

Publications considered:

(1) Vana, J.: The automatic welding of heavy-gauge aluminum (in German) Zvaranie XI II (1962), pages 301/305

(2) Maushake, W.: Submerged arc welding of aluminum (in German) ZIS-Mitteilungen 7 (1965), No. 6, pages (826/37

(3) Killing, R. and Puschner, M.: Fully-mechanised welding of heavy cross-sections of aluminum alloys (in German) Schweissen u. Schneiden 23 (1971), No. 6, pages 223/27

(4) Bagryanskii, K. V. et al.: The automatic submerged arc welding of aluminum flanges using a hidden arc Welding Prod. (1974), No. 7, pages 49/49

(5) Bagryanskii, K. V. et al.: Influence of the cryolithe modulus on the properties of flux for the submerged arc welding of aluminum Welding Prod. (1972), No. 2, pages 10/12

I claim:

1. In a process for the submerged arc welding of light metals, such as aluminum and aluminum alloys, especially of aluminum magnesium alloys, the improvement being a sodium-free flux consisting of 20 to 70 percent potassium chloride, 20 to 70 percent of one of calcium chloride and magnesium chloride, 1 to 20 percent of calcium fluoride, 1 to 15 percent of a substance selected from the group consisting of potassium carbonate, calcium carbonate and potassium oxide, and 1 to 20 percent of the low-density filler perlite.

2. Process according to claim 1, characterized in that the substance is capable of lowering the melting point of the flux.

3. Process according to claim 1, characterized in that the substance is capable of releasing gas.

* * * * *